(12) United States Patent
Park

(10) Patent No.: US 12,082,712 B2
(45) Date of Patent: Sep. 10, 2024

(54) CHAIR EQUIPPED WITH MULTI-CHANNEL SOUND SYSTEM

(71) Applicant: TROUND INC., Hanam-si (KR)

(72) Inventor: Jea Bum Park, Namyangju-si (KR)

(73) Assignee: TROUND INC., Hanam-si (KR)

( * ) Notice: Subject to any disclaimer, the term of this patent is extended or adjusted under 35 U.S.C. 154(b) by 133 days.

(21) Appl. No.: 17/820,776

(22) Filed: Aug. 18, 2022

(65) Prior Publication Data

US 2023/0054544 A1 Feb. 23, 2023

(30) Foreign Application Priority Data

Aug. 19, 2021 (KR) ........................ 10-2021-0109345

(51) Int. Cl.
*A47C 7/72* (2006.01)
*H04R 5/02* (2006.01)
*B60N 2/879* (2018.01)

(52) U.S. Cl.
CPC ............. *A47C 7/727* (2018.08); *H04R 5/023* (2013.01); *A47C 7/72* (2013.01); *B60N 2/879* (2018.02)

(58) Field of Classification Search
CPC ........... A47C 7/727; A47C 7/72; A47C 7/723; A47C 7/725; H04R 5/023; B60N 2/879
See application file for complete search history.

(56) References Cited

U.S. PATENT DOCUMENTS

| 4,075,438 A * | 2/1978 | Kappel | H04R 5/023 |
| | | | 381/301 |
| 6,744,898 B1 * | 6/2004 | Hirano | H04R 5/023 |
| | | | 381/301 |
| 6,968,068 B1 | 11/2005 | Amsel | |
| 9,220,348 B2 * | 12/2015 | Stieler | A47C 7/68 |
| 2002/0181727 A1 | 12/2002 | Shen et al. | |
| 2012/0223555 A1 * | 9/2012 | Brown, Jr. | A47C 7/72 |
| | | | 177/1 |

FOREIGN PATENT DOCUMENTS

CN 108095404 A 6/2018
KR 10-2021-0090410 A 7/2021

* cited by examiner

*Primary Examiner* — Syed A Islam
(74) *Attorney, Agent, or Firm* — Studebaker & Brackett PC

(57) ABSTRACT

The present invention relates to a chair equipped with a multi-channel sound system, and more particularly, to a chair equipped with a multi-channel sound system, which is capable of providing a sense of space and a three-dimensional effect for a user who sits in the chair through sounds output from a plurality of channels and allows the user to adjust orientation directions and orientation angles of speakers by himself or herself and realize a sound environment optimized for the user.

17 Claims, 7 Drawing Sheets

CHAIR EQUIPPED WITH MULTI-CHANNEL SOUND SYSTEM

CROSS-REFERENCE TO RELATED APPLICATION

This application claims priority to and the benefit of Korean Patent Application No. 10-2021-0109345, filed on Aug. 19, 2021, the disclosure of which is incorporated herein by reference in its entirety.

BACKGROUND

1. Field of the Invention

The present invention relates to a chair equipped with a multi-channel sound system, and more particularly, to a chair equipped with a multi-channel sound system, which is capable of providing a sense of space and a three-dimensional effect for a user who sits in the chair through sounds output from a plurality of channels and allows the user to adjust orientation directions and orientation angles of speakers by himself or herself and realize a sound environment optimized for the user.

2. Discussion of Related Art

In general, a speaker used while being connected to a computer generates sound by converting a current flowing through a wire into an electrical signal and a vibration signal and generating vibrations using a vibration portion.

For example, when watching a movie or playing a game using a computer, a user not only watches images on a screen of the computer but also listens to sounds due to an electrical signal being transferred and vibrations generated by a speaker corresponding to the images being transferred to ears of the user while the user sits in a chair where a monitor of the computer is seen.

Particularly, a multi-channel sound system including a plurality of such speakers has an advantage of allowing a user to more exquisitely experience a direction, level, and the like of a sound of a video.

However, in order to implement such multi-channel sound systems, it is necessary to provide a plurality of speakers above and below a desk, behind a chair, and the like, and to electrically connect all of the plurality of speakers such that there is a great restriction in space.

Also, although a multi-channel sound system is implemented by arranging the plurality of speakers, there is a problem when a position of the chair is changed, or a variety of physical interferences are present between the speakers and the user who sits in the chair.

SUMMARY OF THE INVENTION

The present invention is directed to providing a chair equipped with a multi-channel sound system, which is capable of providing a sense of space and a three-dimensional effect for a user who sits in the chair through sounds output from a plurality of channels.

The present invention is also directed to providing a chair equipped with a multi-channel sound system, which allows a user to adjust orientation directions and orientation angles of speakers and realize a sound environment optimized for the user. The present invention is also directed to providing a chair including at least 1) a headrest portion configured to support a head part of a user, 2) a backrest portion configured to support a back and waist part of the user, 3) a seat portion configured to support a buttocks part and parts of legs of the user, and 4) a side support configured to support a side part of the user, wherein the chair includes at least one installation frame which is installed in the headrest portion or the backrest portion and has a shape which extends from the headrest portion or the backrest portion in a direction toward the front of the user seated on the chair, and at least one first speaker frame which is connected to the installation frame through a first rotation shaft and provided to be rotatable within a predetermined angular range about an axial direction of the first rotation shaft, wherein the first speaker frame has a shape extending in one direction, and a first speaker installation region in which at least one speaker is installed in the direction in which the first speaker frame extends is defined.

In one embodiment, the installation frame has a shape which extends from the headrest portion or the backrest portion in a direction toward the front of the user past a side of the user seated on the chair.

According to one aspect of the present invention, there is provided a chair including at least 1) a headrest portion configured to support a head part of a user, 2) a backrest portion configured to support a back and waist part of the user, 3) a seat portion configured to support a buttocks part and parts of legs of the user, and 4) a side support configured to support a side part of the user, wherein the chair includes at least one installation frame which is installed in the headrest portion or the backrest portion and has a shape which extends from the headrest portion or the backrest portion in a direction toward the front of the user seated on the chair, and at least one first speaker frame which is connected to the installation frame through a first rotation shaft and provided to be rotatable within a predetermined angular range about an axial direction of the first rotation shaft, wherein the first speaker frame has a shape extending in one direction, and a first speaker installation region in which at least one speaker is installed in the direction in which the first speaker frame extends is defined.

In one embodiment, the installation frame has a shape which extends from the headrest portion or the backrest portion in a direction toward the front of the user past a side of the user seated on the chair.

As used herein, the term "multi-channel sound system" refers to a sound system implemented through at least two independent channels, and for this purpose, a multi-channel sound system may include at least two speakers, or may include three or more speakers.

In one embodiment, at least one head frame having a shape which passes above the user who sits in the chair and extends in a forward direction of the user may be installed in the backrest portion or the headrest portion, and a second speaker installation region in which at least one speaker is installed may be defined inside the head frame facing the user who sits in the chair.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
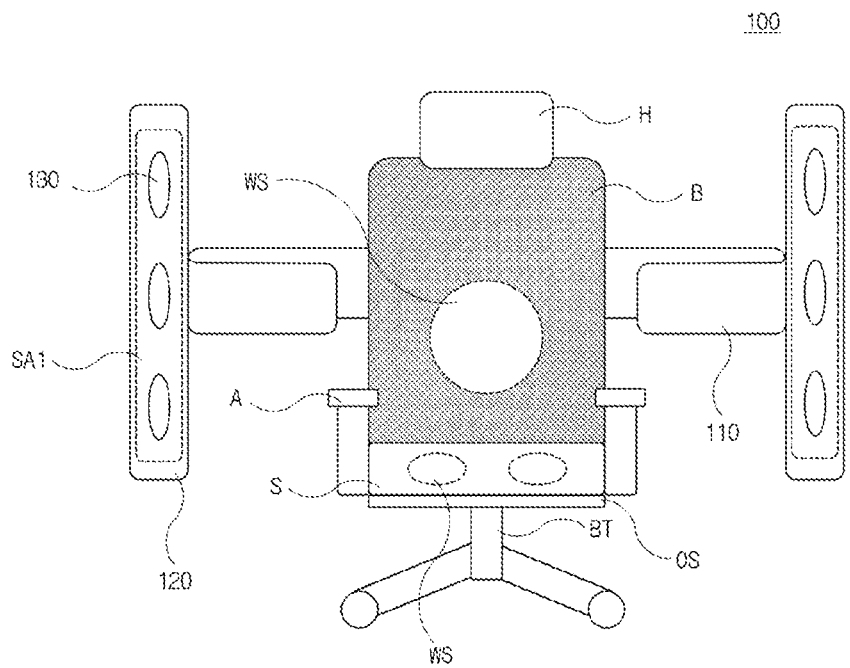
FIG. 1 is a front view of a chair according to an embodiment of the present invention.
Figure 2:
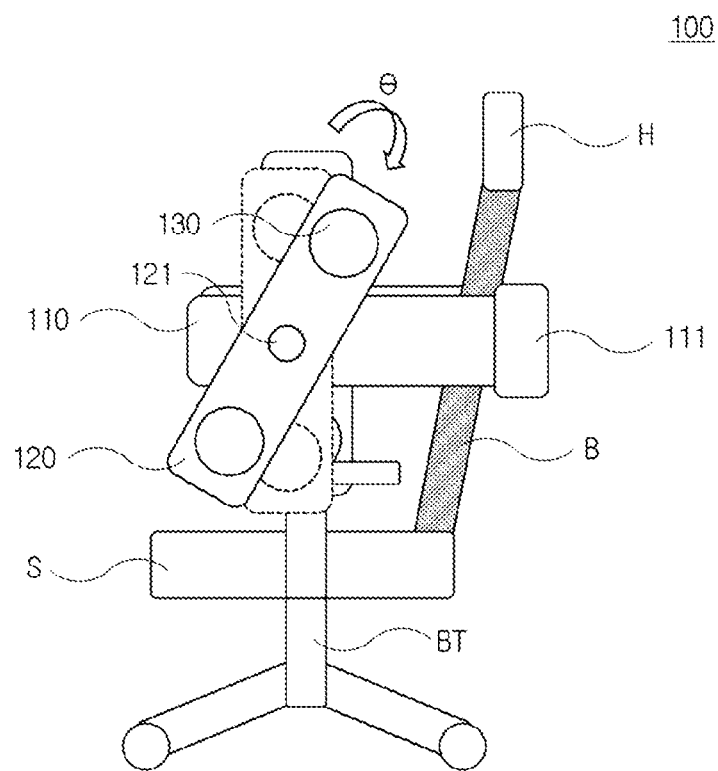
FIGS. 2 and 3 are side views of the chair illustrated in FIG. 1.
Figure 3:
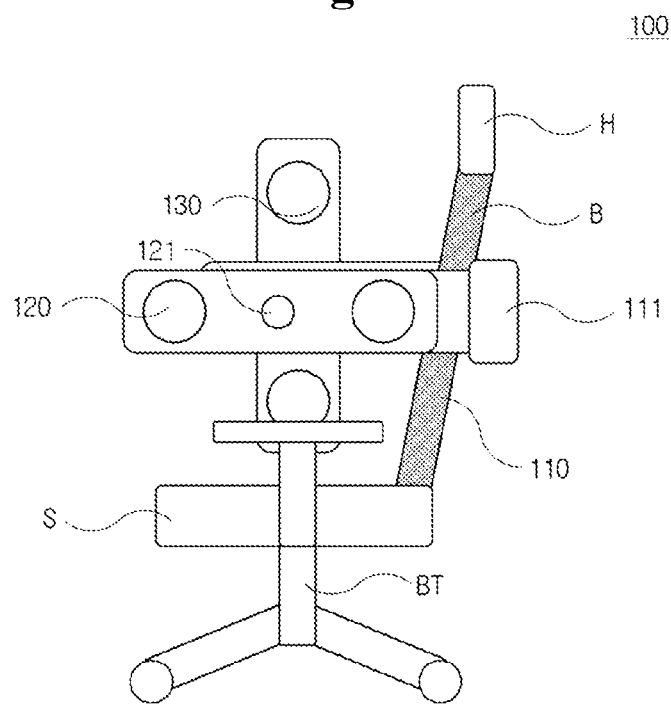

FIG. 1 is a front view of a chair according to an embodiment of the present invention, and FIGS. 2 and 3 are side views of the chair illustrated in FIG. 1.

Referring to FIGS. 1 to 3, a chair 100 includes at least 1) a headrest portion H configured to support a head part of a user who sits in the chair 100, 2) a backrest portion B configured to support a back and waist part of the user, 3) a seat portion S configured to support a buttocks part and parts of legs of the user, and 4) a side support A configured to support a side part of the user.

In the drawings referred to herein, the chair 100 is illustrated as a movable chair in which a movable member BT is provided under the seat portion S, but the present invention is not limited thereto, and the chair 100 may be provided in the form of a non-movable chair, for example, a sofa.

The headrest portion H installed on the backrest portion B may be separated from the backrest portion B or the headrest portion H and the backrest portion B may be integrally configured, as necessary.

Fronts and interiors (i.e., directions in which the back, waist, side, and the like of the user touch) of the headrest portion H, the backrest portion B, and/or the seat portion S may be formed of a cushioning material or provided in the form of a cushioning material added thereon for comfort of the user.

Further, a woofer speaker WS may be additionally provided in the backrest portion B and/or the seat portion S. When the woofer speaker WS is additionally provided in the backrest portion B and/or the seat portion S, vibrations generated by the woofer speaker WS may be directly transferred to the user who sits in the chair 100, and thus it is possible to provide a more vivid user experience. The woofer speaker WS provided inside the backrest portion B and/or the seat portion S may be provided as an appropriate number of woofer speakers WS required to implement a multi-channel sound system. The woofer speaker WS may be installed in at least one region selected from among fronts, rears, sides, and interiors of the backrest portion B and/or the seat portion S. Meanwhile, the woofer speaker WS may be substituted by vibrator, such as shaker bass or tactile transducer.

Although not illustrated separately, at least one selected from among a heating unit, a ventilation unit, and a massage unit may be provided in the backrest portion B and/or the seat portion S for comfort of the user who sits in the chair 100.

Meanwhile, a vibration mitigating member OS may be optionally provided between the seat portion S and the movable member BT. The vibration mitigating member OS serves to prevent or mitigate vibrations generated by a plurality of speakers disposed above the seat portion S from being transferred toward a lower side of the chair 100. The vibration mitigating member OS is formed of a material capable of absorbing vibrations, such as a spring, a cushion, a foam, or the like.

At least one installation frame 110 having a shape which extends from the headrest portion H or the backrest portion B in a direction toward the front of the user seated on the chair 100.

In one embodiment, the installation frame 110 has a shape which extends from the headrest portion H or the backrest portion B in a direction toward the front of the user past a side of the user seated on the chair 100.

Hereinafter, although the embodiment in which the installation frame 110 is installed in the backrest portion B is described for convenience, the installation frame 110 may be installed in, instead of the backrest portion B, the headrest portion H, the seat portion S, or the side support A.

The at least one installation frame 110 extending to a predetermined length in a forward direction may be installed in the backrest portion B, and the installation frame 110 may have a shape which extends from the headrest portion or the backrest portion in a direction toward the front of the user past both sides of the user seated on the chair 100.

Here, the forward direction is a direction toward the front of the user who sits in the chair 100, and is a direction toward an arbitrary position which is positioned at least relatively forward with respect to both sides of the user who sits in the chair 100. That is, in this case, one end portion of the installation frame 110 that is not fixed to the chair 100 may be positioned in a forward view of the user who sits in the chair 100.

Further, the installation frame 110 may have a straight-line shape extending to a predetermined length in the forward direction (or direction which extends toward the front of the user after passing the side of the user who sits in the chair 100) of the chair 100 from the backrest portion B, or may have a shape other than the straight-line shape, that is, any one of various shapes, such as a bent line, a curved line, and the like, as necessary.

In this case, the installation frame 110 may have a shape that surrounds the user who sits in the chair 100. Accordingly, when a plurality of speakers 130 are installed in the installation frame 110, it is possible to maintain a constant distance between the plurality of speakers 130 and the user. Further, when a plurality of speakers 130 having different performances are installed in the installation frame 110, it is possible to adjust distances between the respective speakers 130 and the user in consideration of the performances of the speakers 130.

The above-described shape of the installation frame 110 may be equally applied to a first speaker frame, a second speaker frame, and a head frame, which will be described below, without departing from the scope of the present invention.

At least one first speaker frame 120 is installed on the installation frame 110. The first speaker frame 120 has a shape extending in one direction, and a first speaker installation region SA1 in which at least one speaker 130 is installed in the direction in which the first speaker frame 120 extends is defined.

The first speaker frame 120 may have a straight-line shape extending to a predetermined length in one direction, or may have a shape other than the straight-line shape, that is, any one of various shapes, such as a bent line, a curved line, and the like, as necessary.

Further, a plurality of first speaker frames 120 may be installed in the direction in which the installation frame 110 extends. In this case, one first speaker frame 120 may be installed at each of the left and right sides of the user who sits in the chair 100, or a plurality of first speaker frames 120 may be installed at each of the left and right sides of the user who sits in the chair 100.

When a plurality of first speaker frames 120 are installed at each of the left and right sides of the user who sits in the chair 100, the first speaker frames 120 positioned in adjacent regions may be disposed at predetermined intervals so as not to overlap each other during rotation.

As described above, by providing the plurality of first speaker frames 120 on the installation frame 110, it is possible to realize a richer and more vivid sound environment through sounds output from multiple directions.

When the first speaker frames 120 are fixedly installed onto the installation frame 110, the first speaker frames 120 may be installed on the installation frame 110 in a region adjacent to the side of the user who sits in the chair 100. In particular, when the installation frames 110 have a shape which extends from the headrest portion or the backrest portion in a direction toward the front of the user past both sides of the user seated on the chair 100, the first speaker frames 120 may be each installed on the installation frame 110 in a region adjacent to the left side and a region adjacent to the right side of the user who sits in the chair 100.

As illustrated in FIGS. 2 and 3, the first speaker frame 120 may be connected to the installation frame 110 through a first rotation shaft 121 and provided to be rotatable within a predetermined angular range about an axial direction of the first rotation shaft 121.

A stopper which forcibly stops the rotation of the first speaker frame 120 so that the first speaker frame 120 is not rotated at a predetermined angle or more may be additionally provided on the installation frame 110 and/or the first speaker frame 120.

The first speaker frame 120 has a shape extending in one direction so that the at least one speaker 130 can be installed.

Accordingly, when the first speaker frame 120 is placed in a direction perpendicular to the ground, the speaker 130 installed in the first speaker frame 120 may output sound downward from above the user who sits in the chair 100.

Further, when the first speaker frame 120 is placed in a direction parallel to the ground, the speaker 130 installed in the first speaker frame 120 may be installed in a direction extending rearward from the front of the user who sits in the chair 100, and thus the speaker 130 may output sound rearward from the front of the user.

In this case, by allowing the first speaker frame 120 to be rotated between a position at which the first speaker frame 120 is placed in the direction perpendicular to the ground and a position at which the first speaker frame 120 is placed in the direction parallel to the ground, it is possible to realize various sound environments as necessary.

Further, by connecting the first speaker frame 120 to the installation frame 110 through the first rotation shaft 121 and simultaneously disconnecting the connection between the first rotation shaft 121 and the installation frame 110 or the connection between the first speaker frame 120 and the first rotation shaft 121, the first speaker frame 120 may be provided detachably from the installation frame 110.

As described above, when the installation frame 110 and the first speaker frame 120 are able to be separated from each other, simplification of parts constituting the chair 100 and easiness of transport thereof can be improved, and repairs can be made by only separating the frame requiring repair.

The speaker 130 may be a speaker complete product, a speaker unit which is connected to a driving unit separately provided at the first speaker installation region SA1 and operates, a display type speaker, or a thin-film type speaker, and the speaker 130 may include a one-way speaker and a multi-way speaker. The speaker 130 may receive sound signals in a wired or wireless manner and operate. Further, the speaker 130 may be integrally provided with the first speaker frame 120 or may be installed in the first speaker frame 120 through a separate member (e.g., an enclosure or the like).

The description of the speaker 130 will be equally applied to a speaker provided in a second speaker installation region, a third speaker installation region, and a head frame, which will be described below.

Meanwhile, although not illustrated separately, when the speaker receives sound in a wireless manner, the chair 100 may include a wireless reception unit. The wireless reception unit may wirelessly transmit or receive the sound to or from a sound source (e.g., a home theater, a television (TV), a set-top box, a sound bar, a computer, a mobile phone, a tablet computer, etc.) in a manner such as Wi-Fi, Bluetooth, digital enhanced cordless telecommunications (DECT), or Li-Fi. The wireless reception unit may be provided in a binding portion and/or a connection portion, which will be described below. Meanwhile, the wireless reception unit may be installed in an arbitrary region of the chair 100.

Further, the speaker 130 may be directly installed in the first speaker installation region SA1, but the present invention is not limited thereto, and a separate accessory for installing the speaker may be provided between the first speaker installation region SA1 and the speaker 130.

As described above, by adjusting the number of the first speaker frames 120 installed on the installation frame 110, rotation angles of the first speaker frames 120 with respect to the installation frame 110, the number of the speakers 130 installed in the first speaker frame 120, and the like, it is possible to realize various sound environments for the user who sits in the chair 100.

Figure 4:
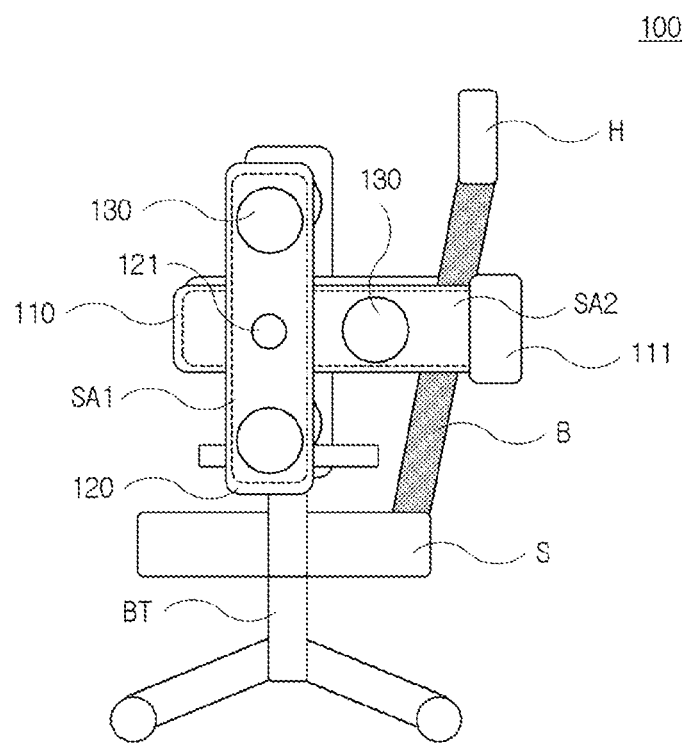
FIG. 4 is a side view of a modified example of the chair of FIG. 1.

Further, as illustrated in FIG. 4, a second speaker installation region SA2 in which the at least one speaker 130 is installed in the direction in which the installation frame 110 extends in addition to the first speaker frame 120 may be defined. That is, the speakers 130 may be installed in both the first speaker frame 120 and the installation frame 110.

In this case, the speaker 130 installed in the first speaker installation region SA1 defined in the first speaker frame 120 and the speaker 130 installed in the second speaker installation region SA2 defined in the installation frame 110 may be provided so as not to overlap each other.

Meanwhile, when the installation frame 110 is installed on a rear surface of the headrest portion H or the backrest portion B, a separate support member 111 for fixing the installation frame 110 to the chair 100 may be interposed in order to withstand the load of the installation frame 110. In this case, the installation frame 110 may be installed on the support member 111 and may have a shape extending to a predetermined length from the rear surface of the headrest portion H or the backrest portion B toward the front of the chair 100.

Figure 5:
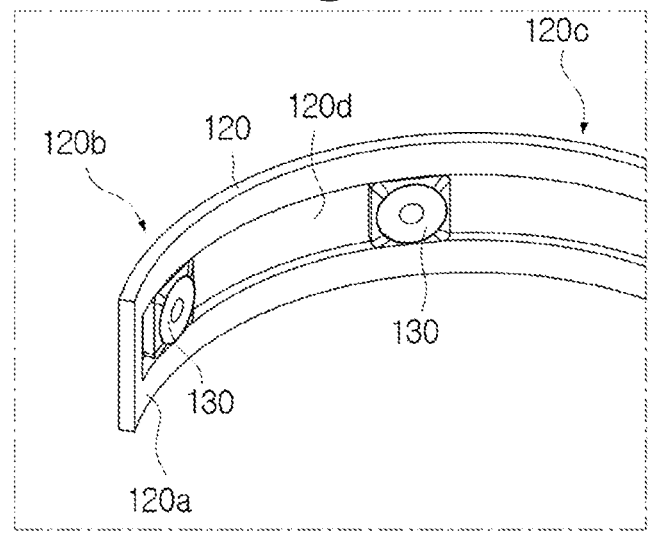
FIGS. 5 to 6B schematically illustrate a first speaker frame provided in the chair illustrated in FIG. 1.
Figure 6A:
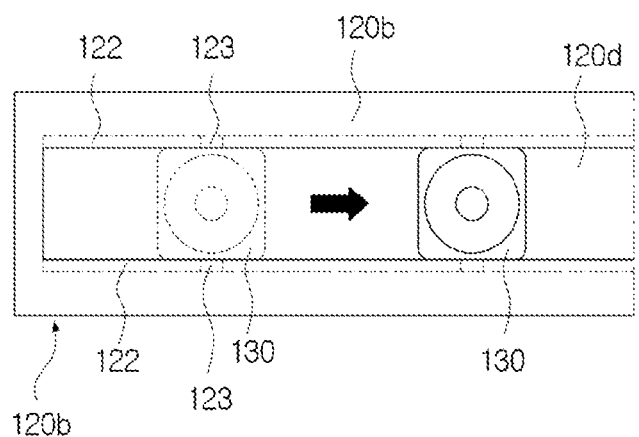
Figure 6B:
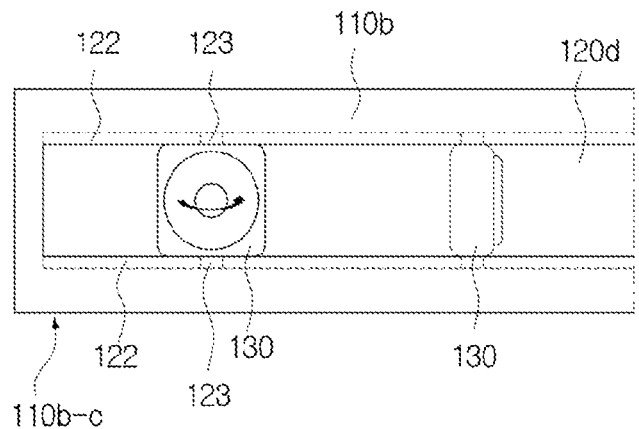

FIGS. 5 to 6B schematically illustrate the first speaker frame provided in the chair illustrated in FIG. 1. Although FIGS. 5 to 6B, for convenience, illustrate only the first speaker frame, the operation of the speaker to be described with reference to FIGS. 5 to 6B may be equally applied to the installation frame, the second speaker frame, and the head frame.

Referring to FIGS. 5 to 6B, the at least one speaker 130 installed in the first speaker frame 120 may be installed to be slidably movable in the direction in which the first speaker frame 120 extends. Accordingly, there is an advantage in that each user may be allowed to customize a sound system for himself or herself by adjusting a position of the at least one speaker 130 installed in the first speaker frame 120.

Specifically, a sliding space 120d having a shape bent in the direction (120b→120c) in which the first speaker frame 120 extends may be formed in an inner surface 120a of the first speaker frame 120. The at least one speaker 130 may be installed in the sliding space 120d. The sliding space 120d may be formed to pass through the first speaker frame 120 but formed such that an outer surface of the first speaker frame 120 is blocked.

Further, referring to FIG. 6A, sliding rails 122 may be selectively provided above and/or below the sliding space 120d. Sliding members 123 provided above and/or below the speaker 130 installed in the sliding space 120d are installed on the sliding rails 122 to be slidably movable. The speaker 130 may be slidably movable by the sliding members 123 in the direction in which the first speaker frame 120 extends while being stably supported by the sliding rails 122 and additionally in the sliding space 120d.

Meanwhile, referring to FIG. 6B, the sliding members 123 may be provided as rotatable members so that the speaker 130 supported by the sliding rails 122 is rotatable about an axial direction.

Accordingly, the at least one speaker 130 installed in the first speaker frame 120 is slidably movable in the direction in which the first speaker frame 120 extends as well as being rotatable about the axial direction so as to realize more variable sound environments.

Figure 7:
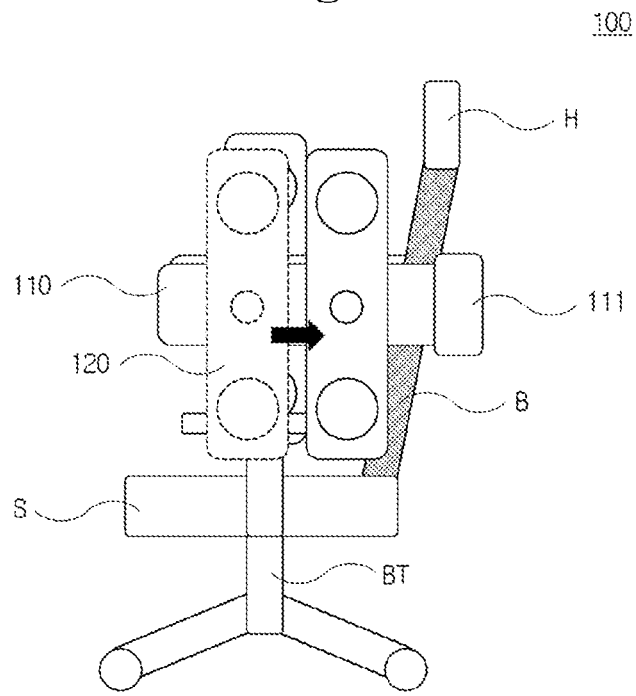
FIGS. 7 to 12 are side views of modified examples of the chair of FIG. 1.

Referring to FIG. 7 which illustrates a side view of a modified example of the chair of FIG. 1, a first speaker frame 120 may be provided to be slidably movable in the direction in which the installation frame 110 extends. Although not illustrated separately, the first speaker frame 120 may be slidably movable along sliding rails provide on the installation frame 110 in the direction in which the installation frame 110 extends.

Figure 8:
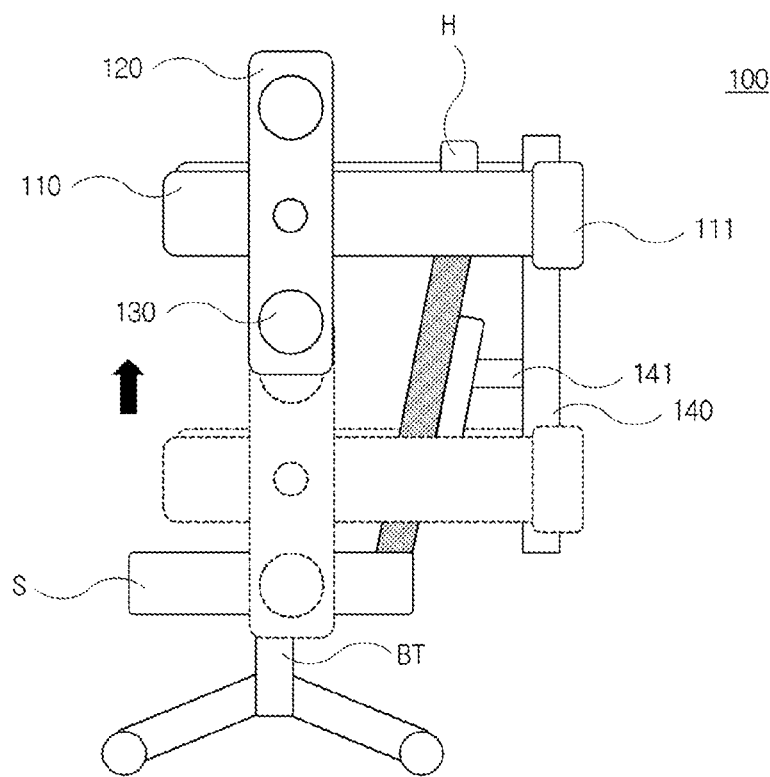

Referring to FIG. 8 which illustrates a side view of a modified example of the chair of FIG. 1, a support frame 140 which extends in a vertical direction may be provided inside the backrest portion or on a rear surface of the backrest portion B, and the installation frame 110 may be connected to the support frame 140 and provided to be movable up and down in the direction in which the support frame 140 extends.

Further, when the backrest portion B has a bent shape at a predetermined angle or can be bent, the support frame 140 may be positioned to be spaced a predetermined interval from the backrest portion B in order to maintain an orientation angle of the installation frame 110.

In this case, the support frame 140 may be positioned parallel to a plane perpendicular to the ground while being spaced apart from the backrest portion B by the predetermined interval, but the present invention is not limited thereto, and the support frame 140 may be provided while being inclined at a predetermined angle with respect to the plane perpendicular to the ground.

To this end, at least one interval adjusting member 141 may be positioned between the backrest portion B and the support frame 140. The interval adjusting member 141 serves to adjust an interval between the backrest portion B and the support frame 140 as well as adjusting an angle of the support frame 140 with respect to the backrest portion B.

The support frame 140 may be integrally formed with the backrest portion B or may be provided to be detachable from the backrest portion B.

According to another embodiment of the present invention, at least one head frame 150 having a shape which extends in the forward direction of the user after passing above or the side of the user who sits in the chair 100 may be installed on the installation frame 110, the backrest portion B, or the headrest portion H.

Hereinafter, although an embodiment in which the head frame 150 is installed in the headrest portion H will be described for convenience, the head frame 150 may be installed in, instead of the headrest portion H, the installation frame 110, the backrest portion B, the seat portion S, the side support A or the support frame 140. If the head frame 150 is installed on the seat portion S or the side support A, the head frame 150 has a shape which extends from the seat portion S or the side support A in a direction upward to the user seated on the chair 100.

Figure 9:
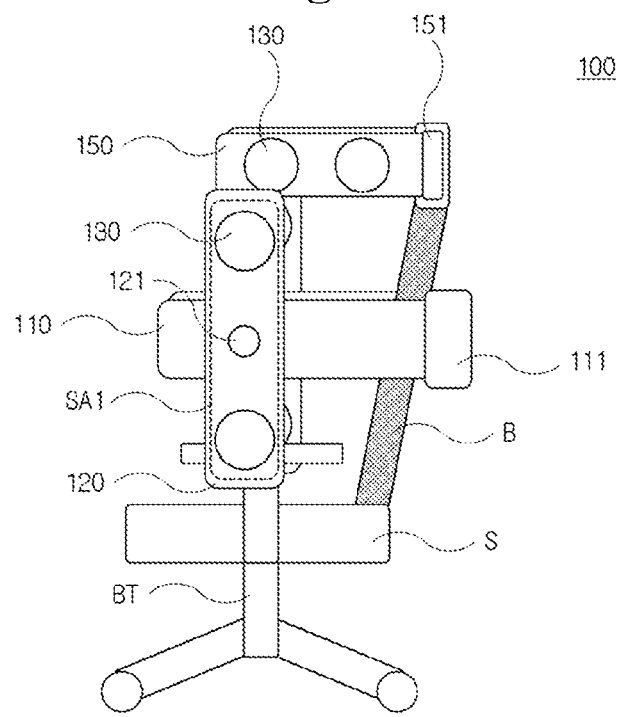

Referring to FIG. 9 which illustrates a side view of a modified example of the chair of FIG. 1, at least one head frame 150 extending to a predetermined length in the direction which extends from the headrest portion H configured to support the head part of the user who sits in the chair 100 in a direction toward the front of the user seated on the chair 100. The head frame 150 may be installed in the headrest portion H through a separate support member 151. Likewise, a third speaker installation region SA3 in which at least one speaker 130 is installed in the direction in which the head frame 150 extends may be optionally defined.

In one embodiment, the head frame 150 has a shape which extends from the headrest portion H or the backrest portion B in a direction toward the front of the user past upper or the side of the user seated on the chair 100.

Figure 10:
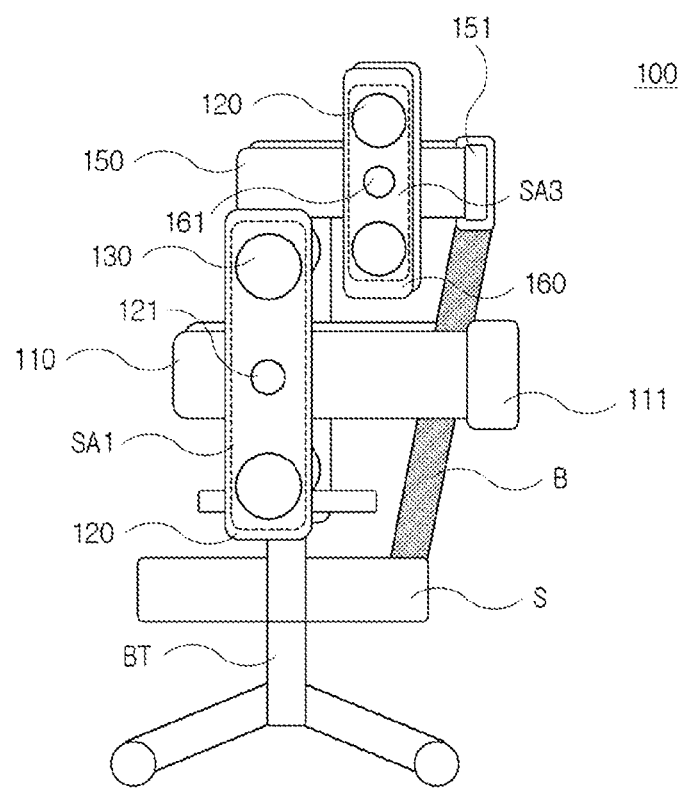

Further, as illustrated in FIG. 10, at least one second speaker frame 160 may be disposed in the direction in which the head frame 150 extends, the second speaker frame 160 may have a shape extending to a predetermined length in a direction crossing the direction in which the head frame 150 extends, and the third speaker installation region SA3 may be defined in at least one frame selected from the head frame 150 and the second speaker frame 160.

When the third speaker installation region SA3 is defined in both the head frame 150 and the second speaker frame 160, the speaker 130 installed in the third speaker installation region SA3 defined in the head frame 150 and the speaker 130 installed in the third speaker installation region SA3 defined in the second speaker frame 160 may be placed at positions so as not overlap each other.

Further, the second speaker frame 160 may be rotatably installed on the head frame 150 in the same manner as the first speaker frame 120 is rotatably installed on the installation frame 110. For example, the second speaker frame 160 may be connected to the head frame 150 through a second rotation shaft 161 and provided to be rotatable within a predetermined angular range about an axial direction of the second rotation shaft 161.

Figure 11:
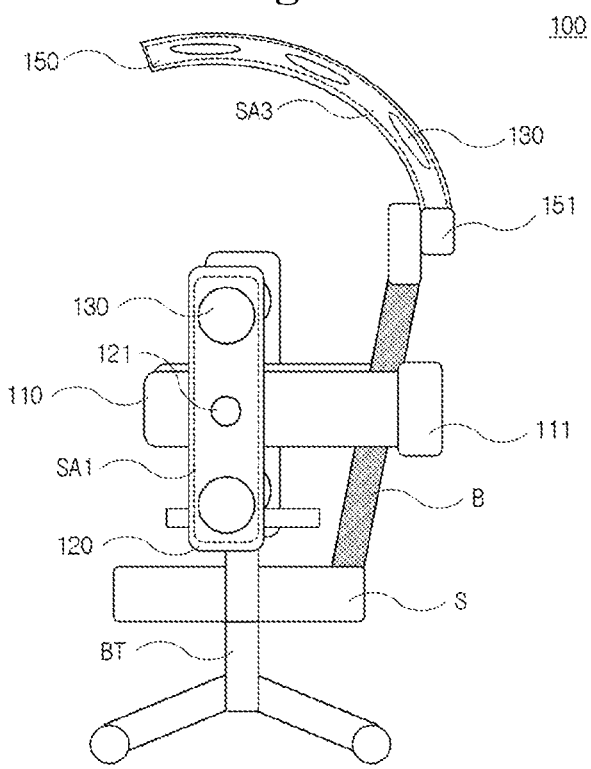

Meanwhile, referring to FIG. 11 which illustrates a side view of a modified example of the chair of FIG. 1, at least one head frame 150 extending to a predetermined length in the direction which passes above the user who sits in the chair 100 and extends toward the front of the user is installed in the headrest portion H configured to support the head part of the user who sits in the chair 100.

That is, unlike the chair of FIG. 10 in which the head frame 150 extends in directions toward the left and right sides of the user who sits in the chair 100 with respect to the headrest portion H, the chair 100 illustrated in FIG. 11 is an embodiment in which the head frame 150 extends in a direction toward upper the user who sits in the chair 100 with respect to the headrest portion H.

The head frame 150 may be installed in the headrest portion H through a separate support member 151. Likewise, the third speaker installation region SA3 in which the at least one speaker 130 is installed in the direction in which the head frame 150 extends may be optionally defined.

Figure 12:
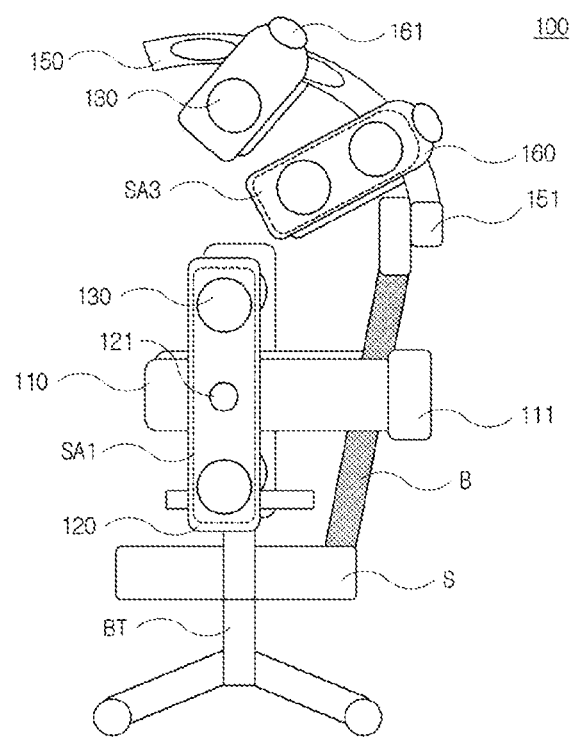

Further, as illustrated in FIG. 12, the at least one second speaker frame 160 may be disposed in the direction in which the head frame 150 extends, the second speaker frame 160 may have a shape extending to a predetermined length in a direction crossing the direction in which the head frame 150 extends, and the third speaker installation region SA3 may be defined in at least one frame selected from the head frame 150 and the second speaker frame 160.

When the third speaker installation region SA3 is defined in both the head frame 150 and the second speaker frame 160, the speaker 130 installed in the third speaker installation region SA3 defined in the head frame 150 and the speaker 130 installed in the third speaker installation region SA3 defined in the second speaker frame 160 may be placed at positions so as not overlap each other.

Further, although not illustrated separately, both the head frame illustrated in FIG. 10 and the head frame illustrated in FIG. 11 may be applied to the chair 100.

Figure 13:
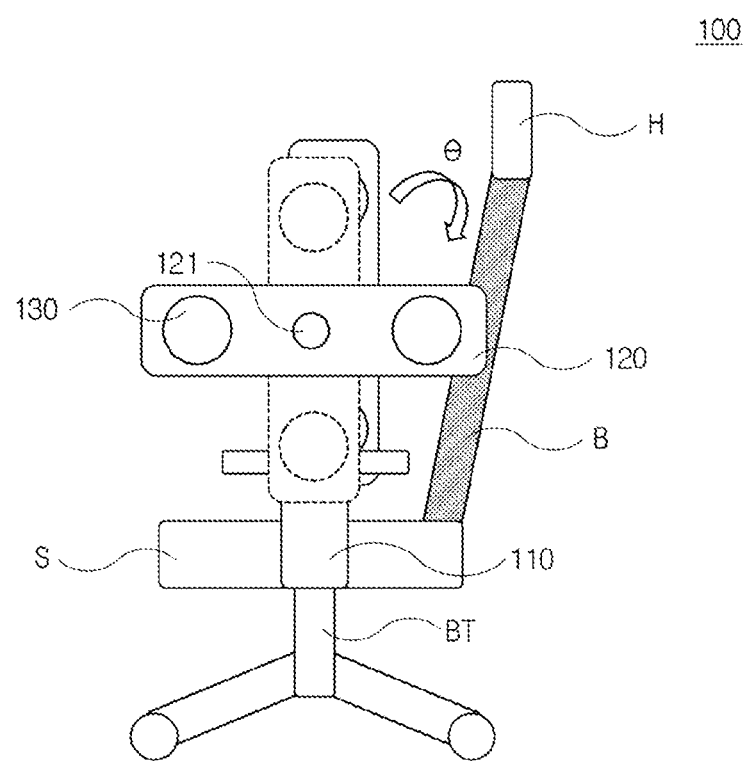
FIG. 13 is a side view of a chair according to another embodiment of the present invention.

FIG. 13 is a side view of a chair according to another embodiment of the present invention. A chair 100 illustrated in FIG. 13 may be equally applied to the content of that illustrated in FIGS. 1 to 12, except that a first speaker frame 120 is installed on an installation frame 110 provided in a seat portion S and/or a side support A.

Referring to FIG. 13, the installation frame 110 is provided in the seat portion S and/or the side support A to have a shape extending in a vertical direction, and the at least one first speaker frame 120 in which a first speaker installation region in which at least one speaker is installed is defined is installed on the installation frame 110.

The first speaker frame 120 may be fixedly installed onto the installation frame 110, or may be connected to the installation frame 110 through a first rotation shaft 121 and provided to be rotatable within a predetermined angular range about an axial direction of the first rotation shaft 121.

Accordingly, the first speaker frame 120 may be rotated, through the first rotation shaft 121, between a direction (i.e., direction perpendicular to the ground) parallel to a direction in which the installation frame 110 extends and a direction (i.e., direction parallel to the ground) perpendicular to the direction in which the installation frame 110 extends.

When the installation frame 110 is rotatably installed on the installation frame 110 provided in the side support A, a first speaker installation region SA1 may be defined not only in the installation frame 110 but also in the side support A.

When the first speaker installation region SA1 is installed in both the installation frame 110 and the side support A, the speaker installed in the speaker installation region defined in the installation frame 110 and the speaker installed in the speaker installation region defined in the side support A may be placed at positions so as not overlap each other.

As described above, according to the present invention, there is an advantage in that a user can experience vivid sounds like those existing in actually reproduced videos or game environments only by sitting in the chair.

Particularly, since it is possible to transfer generated sounds to the user while the sounds are separated in a variety of directions such as frontward, rearward, sideward, upward, downward directions, and the like in reproduced videos or game environments according to positions and the number of speakers provided in the chair, a true multi-channel sound system can be implemented.

In addition, according to the present invention, it is possible to realize a sound environment optimized for the user by moving a speaker frame in which a speaker installation region in which at least one speaker is installed is defined and allowing the user to adjust an orientation direction and an orientation angle of the speaker by himself or herself.

What is claimed is:

1. A chair including at least 1) a headrest portion configured to support a head part of a user, 2) a backrest portion configured to support a back and waist part of the user, 3) a seat portion configured to support a buttocks part and parts of legs of the user, and 4) a side support configured to support a side part of the user, the chair comprising:
at least one installation frame which is installed in the headrest portion or the backrest portion, and has a shape which extends from the headrest portion or the backrest portion in a direction toward the front of the user seated on the chair; and
at least one first speaker frame which is installed on the installation frame and in which a first speaker installation region in which at least one speaker is installed is defined,
wherein the first speaker frame has a shape extending in one direction, and the first speaker installation region is defined in a direction in which the first speaker frame extends, and
wherein:
the first speaker frame is connected to the installation frame through a first rotation shaft coupled with a central portion of the first speaker frame; and
the first speaker frame is configured to rotate within a predetermined angular range about an axial direction of the first rotation shaft.

2. The chair of claim 1, wherein the first speaker frame is installed on the installation frame in a region adjacent to the side of the user who sits in the chair.

3. The chair of claim 1, wherein:
the installation frame has a shape which extends from the headrest portion or the backrest portion in a direction toward the front of the user past both sides of the user seated on the chair; and
the first speaker frame is installed on each installation frame in a region adjacent to the left side of the user who sits in the chair and in a region adjacent to the right side of the user.

4. The chair of claim 1, wherein a second speaker installation region in which at least one speaker is installed in the direction in which the installation frame extends is defined.

5. The chair of claim 1, wherein the first speaker frame is installed to be rotatable, through the first rotation shaft, between a direction parallel to the direction in which the installation frame extends and a direction perpendicular to the direction in which the installation frame extends.

6. The chair of claim 1, wherein:
at least one head frame is installed in the installation frame, the headrest portion or the backrest portion, and has a shape which extends from the installation frame, the headrest portion or the backrest portion in a direction toward the front of the user seated on the chair; and
a third speaker installation region in which at least one speaker is installed in the direction in which the head frame extends is defined.

7. The chair of claim 6, wherein:
at least one second speaker frame is disposed in the direction in which the head frame extends;
the second speaker frame has a shape extending to a predetermined length in a direction crossing the direction in which the head frame extends; and
the third speaker installation region is defined in at least one frame selected from the head frame and the second speaker frame.

8. The chair of claim 7, wherein the second speaker frame is connected to the head frame through a second rotation shaft and provided to be rotatable within a predetermined angular range about an axial direction of the second rotation shaft.

9. The chair of claim 1, wherein:
a support frame having a shape which extends in a vertical direction is provided inside the backrest portion or on a rear surface of the backrest portion; and
the installation frame is connected to the support frame and provided to be movable up and down in the direction in which the support frame extends.

10. The chair of claim 9, wherein:
at least one head frame is installed on the support frame, and has a shape which extends from the support frame in a direction toward the front of the user seated on the chair; and
a third speaker installation region in which at least one speaker is installed in the direction in which the head frame extends is defined.

11. A chair including at least 1) a headrest portion configured to support a head part of a user, 2) a backrest portion configured to support a back and waist part of the user, 3) a seat portion configured to support a buttocks part and parts of legs of the user, and 4) a side support configured to support a side part of the user, the chair comprising:
an installation frame which is installed in the seat portion or the side support and has a shape extending in a vertical direction; and
a first speaker frame which is installed on the installation frame and in which a first speaker installation region in which at least one speaker is installed is defined,
wherein the first speaker frame has a shape extending in one direction, and the first speaker installation region is defined in a direction in which the first speaker frame extends, and
wherein:
the first speaker frame is connected to the installation frame through a first rotation shaft coupled with a central portion of the first speaker frame; and
the first speaker frame is configured to rotate within a predetermined angular range about an axial direction of the first rotation shaft.

12. The chair of claim 11, wherein the first speaker frame is installed to be rotatable, through the first rotation shaft, between a direction parallel to the direction in which the installation frame extends and a direction perpendicular to the direction in which the installation frame extends.

13. The chair of claim 11, wherein a second speaker installation region in which at least one speaker is installed in the direction in which the installation frame extends is defined.

14. The chair of claim 11, wherein:
at least one head frame is installed on the backrest portion or the headrest portion, and has a shape which extends from the backrest portion or the headrest portion in a direction toward the front of the user seated on the chair; and
a third speaker installation region in which at least one speaker is installed in the direction in which the head frame extends is defined.

15. The chair of claim 14, wherein:
at least one second speaker frame is disposed in the direction in which the head frame extends;
the second speaker frame has a shape extending to a predetermined length in a direction crossing the direction in which the head frame extends; and
the third speaker installation region is defined in at least one frame selected from the head frame and the second speaker frame.

16. The chair of claim 15, wherein the second speaker frame is connected to the head frame through a second rotation shaft and is provided to be rotatable within a predetermined angular range about an axial direction of the second rotation shaft.

17. The chair of claim 11, wherein:
at least one head frame is installed on the seat portion or the side support, and has a shape which extends from the seat portion or the side support in a direction upward to the user seated on the chair; and
a third speaker installation region in which at least one speaker is installed in the direction in which the head frame extends is defined.

* * * * *